(12) United States Patent
Fay et al.

(10) Patent No.: US 11,012,761 B1
(45) Date of Patent: May 18, 2021

(54) TECHNIQUES FOR REPLACEMENT CONTENT SIGNALING IN ADVANCED TELEVISION SYSTEMS COMMITTEE (ATSC) 3.0 TELEVISION

(71) Applicant: Sony Corporation, Tokyo (JP)

(72) Inventors: Luke Fay, San Diego, CA (US); Graham Clift, Poway, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/717,958

(22) Filed: Dec. 17, 2019

(51) Int. Cl.
*H04N 21/8543* (2011.01)
*H04H 60/15* (2008.01)
*H04H 60/12* (2008.01)
*H04N 21/845* (2011.01)

(52) U.S. Cl.
CPC ........ *H04N 21/8543* (2013.01); *H04H 60/12* (2013.01); *H04H 60/15* (2013.01); *H04N 21/8456* (2013.01)

(58) Field of Classification Search
CPC ........... H04N 21/8456; H04N 21/8543; H04H 60/12; H04H 60/15
USPC ......................................................... 725/32
See application file for complete search history.

(56) References Cited

U.S. PATENT DOCUMENTS

| | | | | |
|---|---|---|---|---|
| 6,698,020 | B1* | 2/2004 | Zigmond | H04N 21/812 725/34 |
| 2014/0150044 | A1* | 5/2014 | Takahashi | H04N 21/2393 725/116 |
| 2015/0200986 | A1* | 7/2015 | Stockhammer | H04N 21/8455 709/219 |
| 2016/0029095 | A1 | 1/2016 | Poniatowski | |
| 2019/0313150 | A1* | 10/2019 | Cava | H04L 65/605 |
| 2019/0394537 | A1* | 12/2019 | Chen | H04N 21/26258 |

FOREIGN PATENT DOCUMENTS

| | | |
|---|---|---|
| JP | 6072618 B2 | 2/2017 |
| WO | 2017019206 A1 | 2/2017 |

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Standard: ATSC 3.0 Interactive Content (A/344)", May 2, 2019.
"ATSC Standard: ATSC 3.0 Security and Service Protection", Aug. 20, 2019.
"ATSC Standard: ATSC 3.0 System", Sep. 17, 2019.
"ATSC Standard: Signaling, Delivery, Synchronization, and Error Protection (A/331)", Jun. 19, 2019.

(Continued)

*Primary Examiner* — Dominic D Saltarelli
(74) *Attorney, Agent, or Firm* — John L. Rogitz

(57) ABSTRACT

Techniques are described for expanding and/or improving the Advanced Television Systems Committee (ATSC) 3.0 television protocol in robustly delivering the next generation broadcast television services. An empty x-link period is provided at the end of an MPD to alert a newly tuning in receiver to obtain and insert a replacement ad in the period.

20 Claims, 4 Drawing Sheets

(56) References Cited

OTHER PUBLICATIONS

"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.
"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (GCM)," E. Rescorla, Internet Engineering Task Force, Fremont, CA, Aug. 2008.
"RFC 5480, Elliptic Curve Cryptography Subject Public Key Information," S. Turner, D Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Certificate Status Protocol (OCSP) Profile for High-Volume Environments," A. Deacon, R. Hurst, Internet Engineering Task Force, Fremont, CA, Sep. 2007.
Search Report and Written Opinion dated Apr. 1, 2021 from the counterpart PCT application PCT/US2020/065672.

\* cited by examiner

300 ⬊

<MPD  304
302 <Period duration = X
306 <Adaptation set
308 <Representation set
310 Segment 1
Segment 2
⋮
Segment N
</Representation set
</Adaptation set
</Period  314
312 <Period Xlink duration = Y
<Adaptation set (empty)
<Representation set (empty)
<Representation set
</Adaptation set
</Period
</MPD

TECHNIQUES FOR REPLACEMENT CONTENT SIGNALING IN ADVANCED TELEVISION SYSTEMS COMMITTEE (ATSC) 3.0 TELEVISION

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, ATSC 3.0 A/331 refers to Dynamic Adaptive Streaming over HTTP (DASH) as described in ISO/IEC 23009-1 which provides media content presentation information in a media presentation description (MPD). An MPD provides formats to announce resource identifiers for media segments and the context for the identified resources within the media presentation. MPDs may contain multiple periods to describe separate content presentations as time advances. These separate content descriptions have presentation times in the future and enable devices to prepare resources for future presentation of the content. Preparations of the future content include choices in that content where regularly scheduled programs can be replaced with alternative content.

As also understood herein, a problem can arise when attempting to insert such replacement content when the current presentation time (referred to as the "live point") is at the end of a current MPD period. Extensible markup language (XML) linking language (XLink) calls are used to trigger devices to search for replaceable content, which may require several seconds advance notice, during which time an MPD describing the replacement content may not be available. For broadcast services, MPDs use DASH-IF Live Profiles where presentations can use SegmentTemplate templates for number-based segment descriptions in a "Representation." In accordance with the MPEG DASH standard, a Representation is a collection and encapsulation of one or more media streams in a delivery format and associated with descriptive metadata. Presentation timing of segments is calculated as described in the DASH-Interoperability Forum Interoperability Points Version 4.3 Section 3.2.7.1. Specifically, presentation time is given by "Presentation Time=Availability Start Time+Period@start+Representation@presentationTimeOffset." The last term in this equation is optional. Each segment has an internal sample accurate presentation time=earliest presentation time (EPT) and segment duration (DUR). As segments come in, receivers can identify the MPD period to which those segments apply with the equation MPD start time=EPT−Period@start−0.5*DUR.

Future segments can be signaled in Periods with different Period Start and Period Duration times that exceed the current wall clock time. In those future Periods, an XLink can be signaled to trigger a Rx to go fetch alternative content. This is the simple case of XLink usage and has been proven to work.

As understood herein, because MPD's can have different templates and for SegmentTimeline template, XLink operation becomes complicated. The difference from SegmentTemplate is that in SegmentTimeline, ALL listed DASH segments shall be available "now", meaning at the time of the MPD delivery. Consequently, future listing of segments is not possible. Techniques herein are provided relating to how to signal XLink replaceable content in the future with SegmentTimeline templates.

Restated, in SegmentTimeline, the last segment identified in the current MPD period must be available for presentation and is the location of the live point. Most MPD processors jump to the last listed segment in SegmentTimeline template and feed that to the video/audio decoder, meaning that this can be a problem with XLink usage in that any replaceable content indicated must follow the last segment.

Stated differently, if an XLink indicated replacement content is to be inserted, the first step is to identify a new future period with an XLink trigger or marker appearing after the end of the current MPD period. Any segments in this future period will not be playable yet because the server hasn't prepared them yet.

If a receiver is previously tuned in and playing from the live point in the media, an updated MPD with this new future period may not be an issue. However, if a receiver tunes in with this future period already in place it may assume that the live point of the media is at the end of the XLink marked future period, and thus fail. This poses the problem of how to signal a future XLink-marked period in a live profile with dynamic type MPD using SegmentTimeline templates without breaking the receiver. A SegmentTimeline live profile dynamic MPD updates by one segment at a time at a segment duration rate. In such cases the video encoder does not create an end to the current period, rather it just grows with time and old segments are dropped off after a predetermined time. Presentation time of the segments is explicitly listed in the SegmentTimeline template. Devices can read the current UTC wall clock time and pick the segment (usually the last listed one in an MPD period) that aligns with that time for media decoding.

To address the above issue, the MPD can be constructed to list a second future period with no segment, so there will be no media to fetch, but the second future period includes the XLink. By detecting the XLink in the otherwise empty period, the receiver is given time to get ready for replacement content insertion. This works well when segment durations are longer than 2 seconds. The XLink is essentially a trigger in the MPD indicating to the receiver that replacement content data will be offered and to prepare for that content fetching. As time advances, segments will start to populate the second period until eventually the start time for the second period is reached. Those segments will be replaced with the fetched updated segments as directed by the XLink.

The XLink trigger can be sent well in advance of the intended replacement advertisement insertion time by having the second future period start time be multiple segment duration lengths in the future. Receivers can then fetch content in preparation for display rendering well in advance of current presentation time. Content replacement may also be accomplished via broadcaster application where an HTML5 application can be notified of a replaceable content period and it selects alternative content for the receiving device. This alternative mode is described in the ATSC A/344 Interactive Content standard.

The identified future second period with an XLink also enables the receiver to notify a broadcaster application to instruct the receiver to cache the necessary segments and prepare replacement content. Thus, an empty XLink-marked period of fixed duration may be placed at the end of an MPD, with no segments, to act as a trigger for the receiver to alert the broadcaster application and, in response to a transaction with the broadcaster application, receive information on where to retrieve a replacement content. The receiver will tune in to the correct live segment by referencing the UTC wall clock time and identified segment, notify the broadcaster application that an XLink advertisement is available in future, receive an instruction back to cache segments and replace this future empty period with the replacement content. Note that the broadcaster application executing in the receiver has access to information about the user that can be used to personalize the experience, for example, in response to the request to resolve an XLink, it can provide a reference to content suitable for that viewer, e.g. "personalized" advertising.

The receiver carries on playing from the same point in the SegmentTimeline defined in the MPD with dynamically added segments until this new period start time is reached at which point the replacement content (such as an advertisement) is played. A receiver that fails to fetch alternative content will see the empty period start to fill with regularly scheduled segments until this period ends and a new non-XLink period begins. In both cases, at the end of playing out the XLink-marked period, the receiver plays from a new SegmentTimeline period with no XLink, or potentially, a different XLink. This process can thus be extended to include multiple consecutive replacement periods.

Accordingly, a digital television system such as an Advanced Television Systems Committee (ATSC) 3.0 system includes at least one transmitter assembly that in turn includes at least one broadcast source and at least one broadband source. The transmitter assembly includes at least one processor programmed with instructions to generate a first media presentation description (MPD) with at least first and second Period elements. The first Period element includes at least one segment to cause a receiver of the MPD to play media content identified by the segment, whereas the second Period element includes no segments to cause a receiver of the MPD to either directly fetch replaceable content or to notify a broadcaster application of possible replaceable content and receive instruction from the broadcaster application to cache replacement content from an indicated URL and play back the replacement content at a time corresponding to the second period.

In example embodiments, the second period is an extensible markup language (XML) linking language (XLink) Period element. An XML Period element is a Period element in the MPD which includes XLink attributes. Two types of XLink attributes may be used in accordance with A/344, namely, an "xlink:href" attribute to associate the XLink with a URI reference, and an "xlink:show" attribute to indicate of the desired presentation of the ending resource.

Instructions can be executable to provide the MPD from the broadcast source because OTA delivery of signaling enables broadcasters to keep reception of their content to their respective market area. If desired, the instructions can be executable to provide the replacement content from either the broadcast source or from the broadband source. In example embodiments the instructions are executable to locate the second Period element at the end of the MPD, and to configure the second Period element to indicate a duration of the replacement content.

In another aspect, an Advanced Television Systems Committee (ATSC) 3.0 system includes at least one receiver that in turn includes at least one processor programmed with instructions to configure the processor to receive a media presentation description (MPD) having at least first and second Period elements. The first Period element includes at least one segment and the second period filed includes no segments. Responsive to the first Period element, the instructions are executable to play content according to the segment timing (either with SegmentTemplate or SegmentTimeline templates), whereas responsive to the second Period element, the instructions are executable to either execute XLinks directly or signal a broadcaster application that an extensible markup language (XML) linking language (XLink) replacement content is available in future. In response to the signal, the instructions are executable to receive from the broadcaster application a command to cache the XLink replacement content and replace the second period with the replacement content at a time indicated by the second Period element. The instructions are executable to, prior to the time indicated by the second Period element, continue play of media according to the MPD, at the time indicated by the second Period element, play the replacement content.

In another aspect, in a digital television delivery system, a method includes receiving at least one media presentation description (MPD) field, and responsive to a first period in the MPD containing one or more segments, playing content according to the one or more segments. Responsive to a second period in the MPD containing no segments, the method includes retrieving replacement content having a duration indicated by the second period, and at a time indicated by the second period, playing the replacement content.

The details of the present application, both as to its structure and operation, can best be understood in reference to the accompanying drawings, in which like reference numerals refer to like parts, and in which:

DETAILED DESCRIPTION

Figure 1:
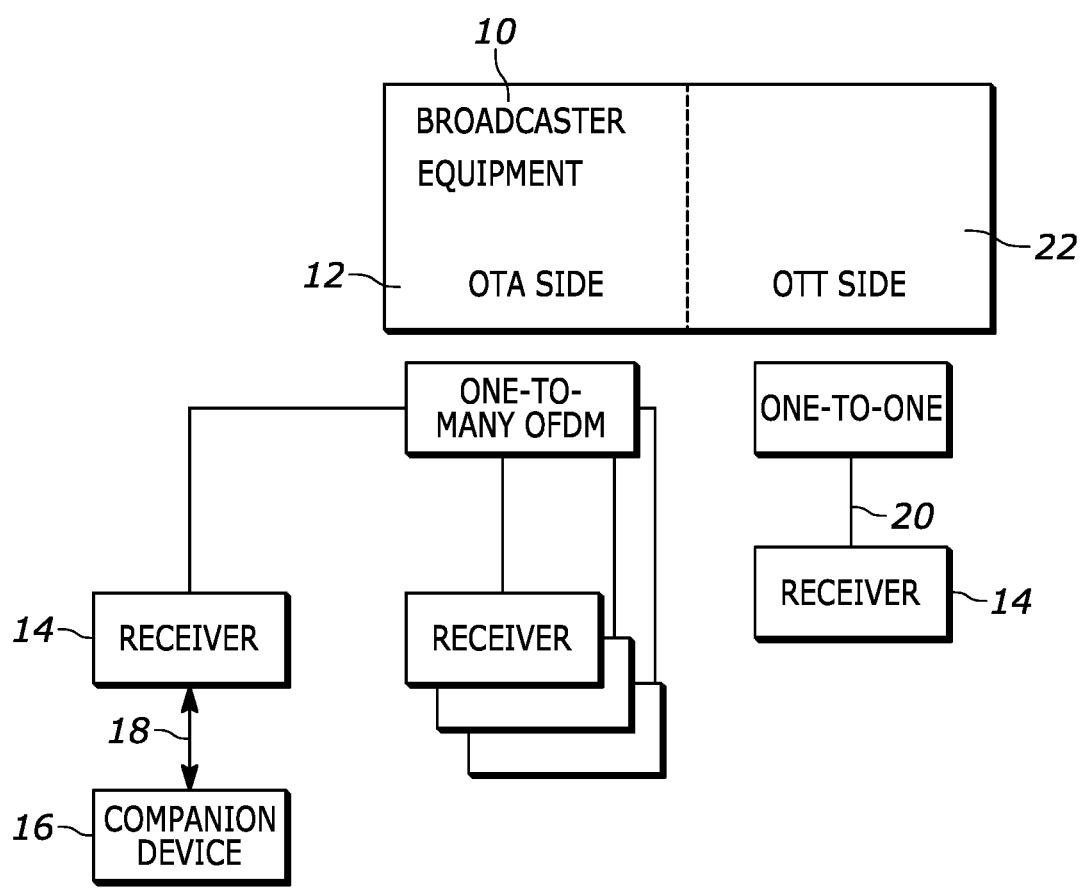
FIG. 1 is a block diagram of an Advanced Television Systems Committee (ATSC) 3.0 system.

This disclosure relates to technical advances in Advanced Television Systems Committee (ATSC) 3.0 television. A system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
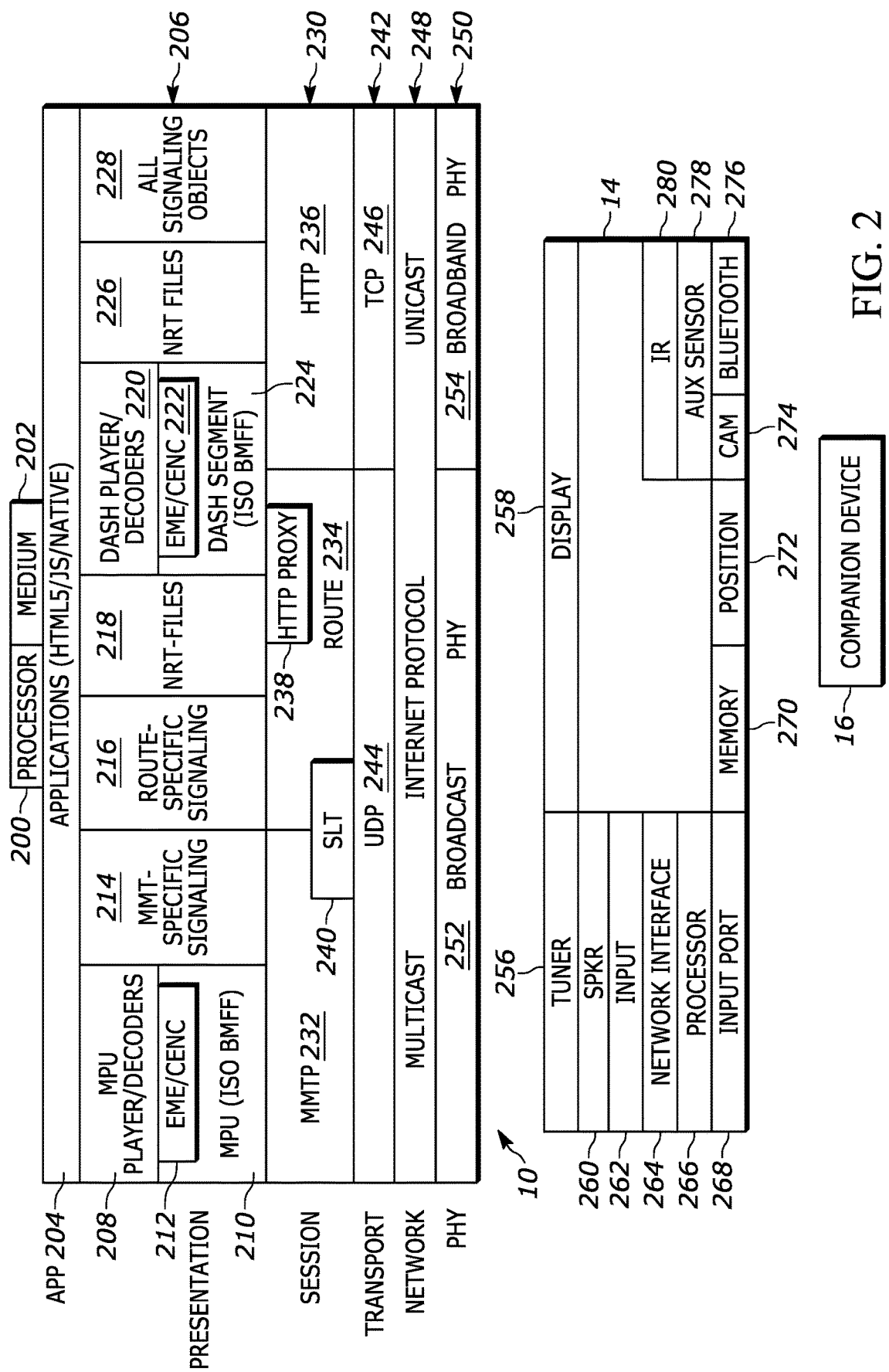
FIG. 2 is a block diagram showing components of the devices shown in FIG. 1.

Referring now to FIG. 2, details of the components shown in FIG. 1 may be seen. FIG. 2 illustrates a protocol stack that may be implemented by a combination of hardware and software. As discussed below, using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)).

The broadcaster equipment 10 can include one or more processors 200 accessing one or more computer storage media 202 such as any memories or storages described herein to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The protocol stack also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with a an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figures 3, 4:
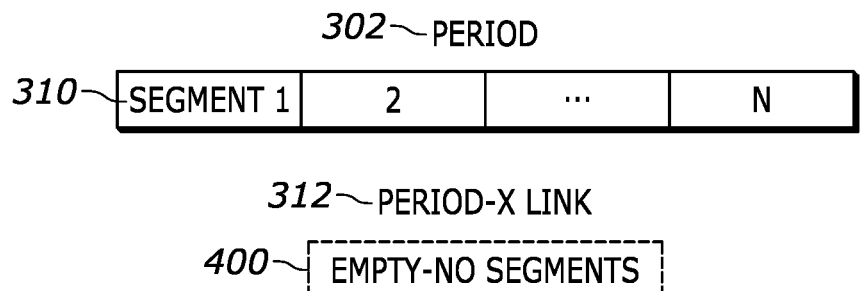
FIG. 3 is an XML description of an MPD with an empty x-link period defining a start time for a replacement advertisement.
FIG. 4 is a diagram of an MPD period with segments and an empty x-link period.

Now referring to FIG. 3, a portion of an ATSC 3.0 media presentation description (MPD) 300 is shown in simplified form with beginnings of elements staring with "<" and ends of elements end with "</". The MPD may be provided from a broadcast source, although in some implementations it can be provided from a broadband source.

In the top level the MPD 300 includes a first period or Period element 302 indicating a period duration 304 and, if desired, a start time. Nested within the period 302 is an adaptation set 306 containing references to a media stream or set of media streams. Nested within the adaptation set 306 is a representation set 308 to allow the adaptation set to contain the same content encoded in different ways. Within the representation set 308 are references to one or more media segments 310 that are the actual media files that the DASH player plays, typically by playing them back-to-back as if they were contiguous portions of one file.

Following the first period 302 is a second period 312, which may be placed at the end of the MPD. Unlike the first period 302 (and any intervening periods), the second period 312 is empty, in that the adaption set has no references to media segments. Should the second period 312 contain an adaptation set and representation set for syntax purposes, they are empty, i.e., there are no segment references in the second period 312. Instead, the second period 312 contains XLink information 314 that causes the DASH receiver to either execute the XLink directly or signal to a broadcaster application of replaceable content, to receive from the broadcaster application instruction to cache replacement content and play back the replacement content at a time corresponding to the second period. The replacement content may be provided from the broadcast source or from the broadband source. The XLink 314 may indicate the duration of the second period and, thus, the duration of the replacement content.

FIG. 4 schematically illustrates that the first period 302 contains multiple segments 310 but that the second period 312 contains no segments, as indicated at 400.

Figure 5:
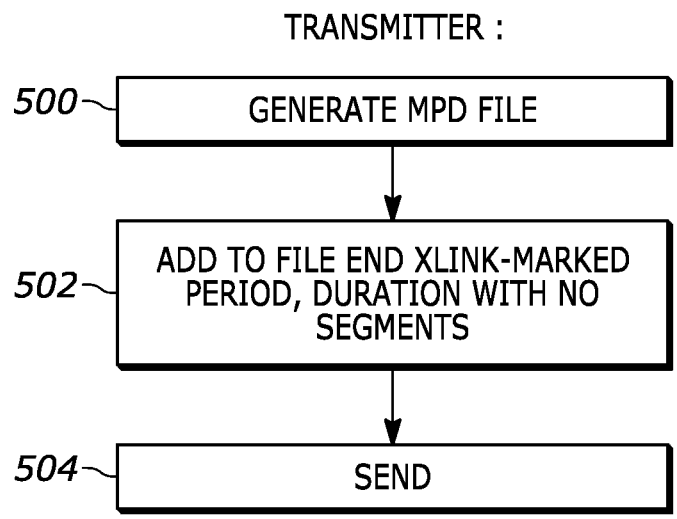
FIG. 5 is a flow chart of example transmitter side logic.
Figure 6:
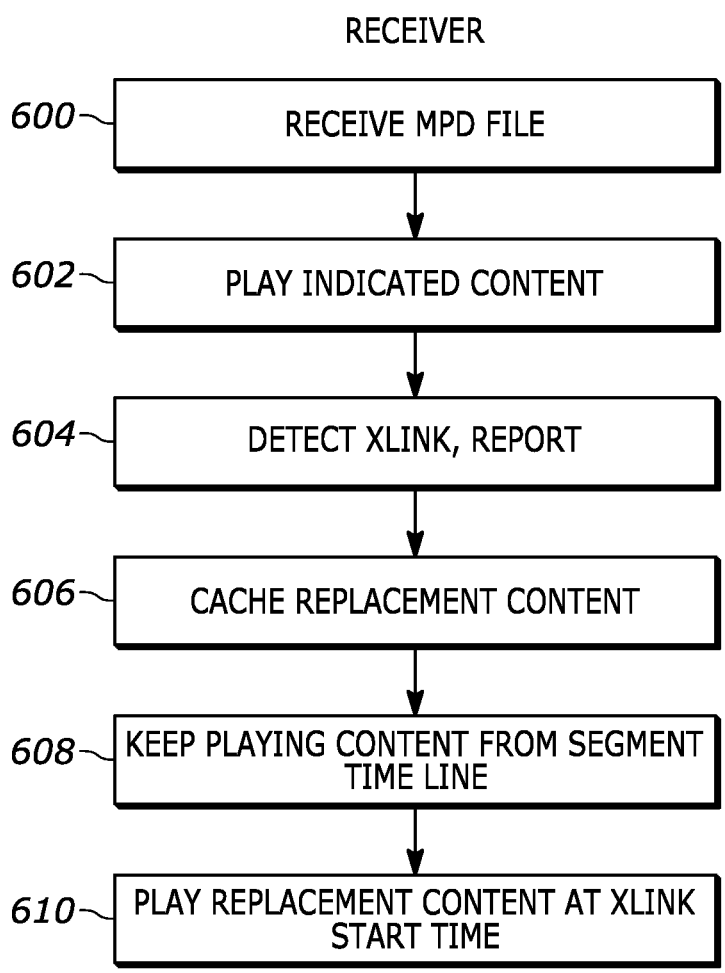
FIG. 6 is a flow chart of example receiver side logic.

FIG. 5 illustrates transmitter logic and FIG. 6 illustrates receiver logic. Commencing at block 500 in FIG. 5, the MPD 300 shown in FIG. 3 is generated. At block 502 the XLink period 312 is added to the MPD, typically at the end of the file, with no segment references. The file is then sent at block 504, e.g., by broadcast means, to a receiver.

The receiver receives the MPD 300 at block 600. Moving to block 602, the receiver begins playing the content consistent with the segments 310 in the first period 302, and typically at the same time detects the XLink period 312 at block 604, because the last period is empty. The receiver either executes the XLink or reports the XLink to the broadcaster application being executed on the receiver by the receiver processor. In so doing the receiver uses a uniform resource locator (URL) associated with the XLink to fetch an object (such as a file) from the referenced location on the internet and uses that as the replacement Period element. Block 606 indicates that in response the receiver receives from the broadcaster app, a Period element to be used to replace the empty period containing the XLink. The Period element contains references to segments the receiver can cache as replacement content. The location of the segments is provided by the broadcaster app. As stated above, the location may be a network address such as a uniform resource locator (URL). Content is continued to be played from the segment timeline at block 608 until the time of the XLink period 312 arrives at block 610, at which point the replacement content that was cached at block 606 is played in lieu of broadcast content that otherwise would be played during the period.

It will be appreciated that whilst present principals have been described with reference to some example embodiments, these are not intended to be limiting, and that various alternative arrangements may be used to implement the subject matter claimed herein.

What is claimed is:

1. A digital television system comprising:
at least one transmitter assembly comprising at least one broadcast source and at least one broadband source, the transmitter assembly comprising:
at least one processor programmed with instructions to:
generate a first media presentation description (MPD) with SegmentTimeline template comprising at least first and second Period elements, the first Period element comprising at least one segment to cause a receiver of the MPD to play media content identified by the segment, the second Period element comprising no segments in that no adaption set of the second period has references to media segments, the second Period element to cause a receiver of the MPD to fetch replaceable content or to notify a broadcaster application of replaceable content and receive instruction from the broadcaster application to cache replacement content from an indicated network address and play back the replacement content at a time corresponding to the second period.

2. The digital television system of claim 1, wherein the second period is an extensible markup language (XML) linking language (XLink) Period element.

3. The digital television system of claim 1, wherein the instructions are executable to:
provide the MPD from the broadcast source.

4. The digital television system of claim 1, wherein the instructions are executable to:
provide the replacement content from the broadcast source.

5. The digital television system of claim 1, wherein the instructions are executable to:
provide the replacement content from the broadband source.

6. The digital television system of claim 1, wherein the instructions are executable to:
locate the second Period element at the end of the MPD.

7. The digital television system of claim 1, wherein the instructions are executable to:
configure the second Period element to indicate a duration of the replacement content.

8. The digital television system of claim 1, comprising the receiver.

9. A digital television system comprising:
at least one receiver comprising at least one processor programmed with instructions to configure the processor to:
receive a first media presentation description (MPD) with SegmentTimeline template comprising at least first and second Periods, the first Period comprising at least one segment and the second Period comprising no segments;
responsive to the first Period, play content according to the segment;
responsive to the second Period, execute at least one extensible markup language (XML) linking language (XLink) or signal a broadcaster application that an extensible markup language (XML) linking language (XLink) replacement content is available in future;
in response to the signal, receive from the broadcaster application a command to cache the XLink replacement content and replace the second Period with the replacement content at a time indicated by the second Period;
prior to the time indicated by the second Period, continue play of media according to the MPD; and
at the time indicated by the second Period, play the replacement content.

10. The digital television system of claim 9, wherein the instructions are executable to:
responsive to failing to play the replacement content in the second Period, identify that the second period fills with segments until the second Period ends; and
play content indicated by the segments in the second Period.

11. The digital television system of claim 9, wherein the instructions are executable to:
receive the MPD from a broadcast source.

12. The digital television system of claim 9, wherein the instructions are executable to:
receive the replacement content from a broadcast source.

13. The digital television system of claim 9, wherein the instructions are executable to:
receive the replacement content from a broadband source.

14. The digital television system of claim 9, wherein the broadcaster application is executed by the processor of the receiver.

15. In a digital television system, a method comprising:
receiving at least one media presentation description (MPD);
responsive to a first period in the MPD containing one or more segments, playing content according to the one or more segments;
responsive to a second period in the MPD containing no segments, retrieving replacement content having a duration indicated by the second period; and
at a time indicated by the second period, playing the replacement content.

16. The method of claim 15, comprising:
responsive to the second period, signaling to a broadcaster application that an extensible hypertext markup language link (XLink) trigger has arrived.

17. The method of claim 16, comprising:
responsive to signaling the broadcaster application that the XLink trigger has arrived, receiving a command from the broadcaster application to retrieve the replacement content.

18. The method of claim 15, comprising retrieving the replacement content from a broadband source.

19. The method of claim 15, comprising retrieving the replacement content from a broadcast source.

20. The method of claim 15, comprising receiving the MPD from a broadcast source.

\* \* \* \* \*